United States Patent
Kamp et al.

(10) Patent No.: US 11,522,876 B2
(45) Date of Patent: Dec. 6, 2022

(54) METHOD AND DEVICE FOR DETECTING AN ATTACK ON A SERIAL COMMUNICATIONS SYSTEM

(71) Applicant: VOLKSWAGEN AKTIENGESELLSCHAFT, Wolfsburg (DE)

(72) Inventors: Birger Kamp, Rötgesbüttel (DE); Anke Jentzsch, Tiddische (DE); Viktor Bunimov, Vechelde (DE); Steven Michna, Berlin (DE); Christoph Riechel, Langelsheim (DE)

(73) Assignee: Volkswagen Aktiengesellschaft

( * ) Notice: Subject to any disclaimer, the term of this patent is extended or adjusted under 35 U.S.C. 154(b) by 317 days.

(21) Appl. No.: 16/644,739

(22) PCT Filed: Aug. 27, 2018

(86) PCT No.: PCT/EP2018/073031
§ 371 (c)(1),
(2) Date: Mar. 5, 2020

(87) PCT Pub. No.: WO2019/052798
PCT Pub. Date: Mar. 21, 2019

(65) Prior Publication Data
US 2021/0067523 A1    Mar. 4, 2021

(30) Foreign Application Priority Data
Sep. 12, 2017 (DE) .................. 10 2017 216 096.9

(51) Int. Cl.
*H04L 9/40*     (2022.01)
(52) U.S. Cl.
CPC ...... *H04L 63/1416* (2013.01); *H04L 63/1425* (2013.01); *H04L 63/1466* (2013.01)

(58) Field of Classification Search
CPC ............. H04L 63/1416; H04L 63/1425; H04L 63/1466
See application file for complete search history.

(56) References Cited

U.S. PATENT DOCUMENTS

| | | | |
|---|---|---|---|
| 2003/0067921 A1* | 4/2003 | Sivalingham | ......... H04W 12/06 370/394 |
| 2012/0198277 A1* | 8/2012 | Busser | ................... G06N 20/00 714/26 |

(Continued)

FOREIGN PATENT DOCUMENTS

| | | |
|---|---|---|
| CN | 102577305 A | 7/2012 |
| CN | 106255964 A | 12/2016 |

(Continued)

OTHER PUBLICATIONS

Search Report for International Patent Application No. PCT/EP2018/073031; dated Nov. 21, 2018.

(Continued)

*Primary Examiner* — Maung T Lwin
*Assistant Examiner* — Mudasiru K Olaegbe
(74) *Attorney, Agent, or Firm* — Barnes & Thornburg, LLP

(57) ABSTRACT

A method for detecting an attack on a serial communications system which determines the status of messages transmitted via the serial communications system to obtain a sequence of statuses, compares the sequence of statuses with at least one reference sequence, and determines that there is an attack on the serial communications system in response to the sequence of statuses deviating from the reference sequence. The status of one of the messages is based on properties of the message and properties of a preceding message.

24 Claims, 5 Drawing Sheets

(56) References Cited

U.S. PATENT DOCUMENTS

| | | | | |
|---|---|---|---|---|
| 2015/0113638 A1* | 4/2015 | Valasek | G06F 21/562 |
| | | | 726/22 |
| 2015/0309960 A1* | 10/2015 | Pitigoi-Aron | G06F 13/4291 |
| | | | 710/106 |
| 2016/0173513 A1* | 6/2016 | Rohde | H04L 63/126 |
| | | | 726/23 |
| 2016/0188396 A1* | 6/2016 | Sonalker | G06F 11/079 |
| | | | 714/37 |
| 2016/0381059 A1* | 12/2016 | Galula | H04L 63/02 |
| | | | 726/23 |
| 2017/0364472 A1* | 12/2017 | Pitigoi-Aron | G06F 13/4291 |
| 2019/0356687 A1* | 11/2019 | Hartkopp | H04L 12/40 |
| 2019/0385057 A1* | 12/2019 | Litichever | H04L 63/14 |

FOREIGN PATENT DOCUMENTS

| | | |
|---|---|---|
| DE | 102015205670 A1 | 6/2016 |
| EP | 3113529 A1 | 1/2017 |

OTHER PUBLICATIONS

Office Action for Chinese Patent Application No. 201880059245.8; dated Sep. 9, 2021.

\* cited by examiner

METHOD AND DEVICE FOR DETECTING AN ATTACK ON A SERIAL COMMUNICATIONS SYSTEM

PRIORITY CLAIM

This patent application is a U.S. National Phase of International Patent Application No. PCT/EP2018/073031, filed 27 Aug. 2018, which claims priority to German Patent Application No. 10 2017 216 096.9, filed 12 Sep. 2017, the disclosures of which are incorporated herein by reference in their entireties.

SUMMARY

Illustrative embodiments relate to the monitoring of communications systems. In particular, illustrative embodiments relate to a method and a device for detecting an attack on a serial communications system.

BRIEF DESCRIPTION OF THE DRAWINGS

Example embodiments are explained in detail below with reference to the accompanying figures, wherein.

DETAILED DESCRIPTION

Figure 1:
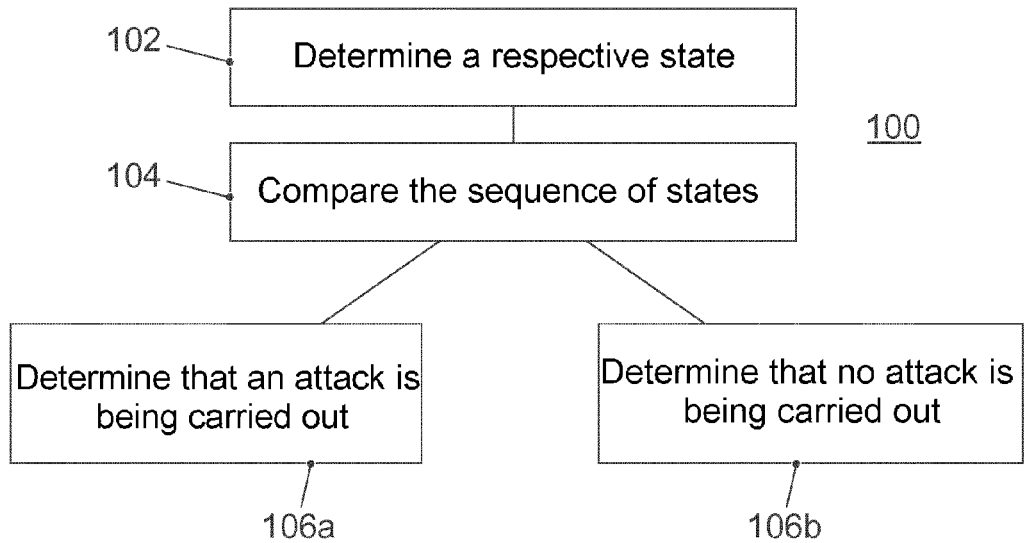
FIG. 1 shows a flow diagram of an example embodiment of a method for detecting an attack on a serial communications system.

The transportation vehicle has now become an integral part of the World Wide Web. A transportation vehicle is a mobile way for carrying people or goods. The transportation vehicle may therefore be not only a passenger vehicle, but also a commercial vehicle. A transportation vehicle may, for example, be a passenger vehicle, a goods vehicle, a motorcycle or a tractor. In general, a transportation vehicle may be understood to mean a device which comprises an engine, a powertrain system and wheels. The number of transportation vehicle access points available online is growing rapidly. The potential threat from attacks on the transportation vehicle and its core component, the electronic system, is also increasing in the same way. This applies in particular to the bus systems which implement the communications between the control units of the transportation vehicle. An intrusion into this communications structure can cause the complex transportation vehicle system to plunge into unplanned states. Monitoring of the transportation vehicle bus systems is therefore desirable.

Publication US 2016/0188396 A1 proposes a method for detecting time-related anomalies in transportation vehicle networks. Every message transmitted via a Controller Area Network (CAN) bus in the transportation vehicle is checked to determine whether the message ID contained therein and the network ID contained therein are in each case known. If so, a further check is carried out to determine whether the currently examined message and also previous messages are normal or abnormal with regard to their time behavior.

In publication EP 3 113 529 A1, a further method is proposed for detecting time-based anomalies in a transportation vehicle communications network. For this purpose, the time interval between two consecutive messages having an identical message identifier is compared with a time model.

The methods proposed in the aforementioned publications cannot detect a multiplicity of attacks. There is therefore a need to provide a facility for improving the detection of attacks on serial communications systems.

Disclosed embodiments provide a method for detecting an attack on a serial communications system. A serial communications system transmits individual bits successively (i.e., serially)—as opposed to parallel communications systems which transmit their data in parallel over a plurality of lines.

The method comprises determining a respective state of a plurality of messages transmitted via the serial communications system to obtain a sequence of states. The state of one of the plurality of messages is based in each case on a plurality of properties of the message and a plurality of properties of a preceding message of the plurality of messages. The features can be understood as low-level descriptors. The individual properties may be irrelevant per se, but their common consideration (i.e., the overall consideration) enables the state classification of a message. The state classification of a message is therefore possible, e.g., via simple comparison operations. This results in a pattern of states, i.e., the sequence of states. The properties of a message may comprise, for example, a content, a (temporal) start of the message, a (temporal) end of the message or an identification of the message as active or inactive.

The method further comprises comparing the sequence of states with at least one reference sequence. In other words, a time behavior of the plurality of messages transmitted via the serial communications system is monitored. The reference sequence of states indicates the order of states in normal (i.e., undisturbed) operation of the serial communications system. Deviations from the normal (i.e., defined) time behavior of the messages represented by the reference sequence may therefore indicate a manipulation of the serial communications system.

Accordingly, the method further comprises determining that an attack is being carried out on the serial communications system if the sequence of states deviates from the reference sequence. Since the comparison of the sequence of states with the at least one reference sequence can be carried out very efficiently and with little processing power, the disclosed method enables a simple and efficient monitoring of a serial communications system.

If the sequence of states matches the reference sequence, the method may comprise determining that no attack is being carried out on the serial communications system.

According to some example embodiments, the state of the message may be based on at least a first comparison of a content of the message with a content of the preceding message, and on a second comparison of the time difference between a start of the message and a start of the preceding message with a comparison value. In addition to the message content, the start of the first message is thus compared with the start of the preceding message to determine a time interval between the messages. The message content and also the time interval between successive messages are characteristic and are therefore suitable for the state description of the message. The comparison value may, for example, be a cycle time used by the serial communications system or an inhibit time between successive messages. The state of the message may furthermore also be based on additional comparisons of the time difference between the start of the message and the start of the preceding message with at least one further comparison value.

In some example embodiments, the state of the message may furthermore also be based on a comparison of one or more properties of the message with a comparison value independent from the plurality of messages. For example, the content of the message (e.g., a status bit) can be compared with a comparison value indicating whether a message is active or inactive. Comparisons of this type may also represent suitable low-level descriptors for determining the state of a message, i.e., for characterizing a message.

According to some example embodiments, the comparison of the sequence of states with at least one reference sequence comprises incrementing a counter if a first state occurs within the sequence of states. The comparison further comprises resetting the counter to an initial value if a second state occurs within the sequence of states. If the counter exceeds a threshold, the comparison comprises determining that the sequence of states deviates from the reference sequence. Additional messages, i.e., inserted messages, change the characteristic pattern, i.e., the characteristic reference sequence. The characteristic reference sequence can be mapped by the threshold value for the counter assigned to the first state. Due to the additional, inserted message, it can now occur that the counter is not reset or is reset too late. The deviation of the sequence of states from the reference sequence can accordingly be easily inferred through the use of a counter.

In some example embodiments, the method further comprises comparing a subarea of the sequence of states with at least one second reference sequence. The subarea of the sequence of states in this case comprises only states which differ from the second state. If the subarea of the sequence of states deviates from the second reference sequence, the method then further comprises determining that an attack is being carried out on the serial communications system. In other words, the sequence of states between a first change of state from the second state to a different state and a second change of state from a different state to the second state is checked. The correctness of the sequence (pattern) of states can thus be further ensured.

According to some example embodiments, the method further comprises comparing the content of a first message of the plurality of messages with the content of a second message of the plurality of messages. The state of the first message is identical to the state of the second message, wherein at least a third message having a state different from the state of the first message is transmitted between the first and the second message via the serial communications system. If the content of the second message is identical to the content of the first message, the method further comprises determining that an attack is being carried out on the serial communications system. Further comparison of the message contents may enable the detection of smarter attacks. For example, attacks on the serial communications system can thus be detected in which messages are introduced which simulate a change of state between successive messages. However, since the message content changes during a normal change of state, these attacks can also be effectively detected.

In some example embodiments, the method further comprises transmitting a message to a receiving device of a monitoring station for the serial communications system if it is determined that an attack is being carried out on the serial communications system. The message comprises information relating to the attack on the serial communications system. In this way, persons responsible for the serial communications system can be made aware of the attack, so that countermeasures (e.g., ignoring messages, disabling the system, etc.) can be undertaken. The information relating to the attack on the serial communications system can be any kind of information relating to the attack, ranging from a simple notification that an attack has been carried out to detailed information relating to, e.g., the type and extent of the attack or affected messages.

According to some example embodiments, the information relating to the attack on the serial communications system comprises information relating to at least a subarea of the sequence of states. The messages affected by the attack (and possibly a number of preceding and/or subsequent messages) of the plurality of messages of the serial communications system can thus be transmitted, for example, to the monitoring station so that they can be more closely evaluated.

In some example embodiments, the plurality of messages are transmitted in each case via a plurality of signals via the serial communications system. The method then further comprises comparing a signal segment of a first of the plurality of signals assigned to the message with a signal segment of the first signal assigned to the preceding message. The information relating to the attack on the serial communications system then comprises information relating to a result of the comparison of the signal segment of the first signal assigned to the message with the signal segment of the first signal assigned to the preceding message. One message can therefore be composed of a plurality of signals. To analyze an attack, it may be helpful to know which of the signals have been attacked. The result of the comparison of the signal segment of the first signal assigned to the message with the signal segment of the first signal assigned to the preceding message can be transmitted in compact form so that the data volume required for the transmission is small.

According to some example embodiments, the information relating to the result of the comparison is binary information which indicates whether the signal segment of the first signal assigned to the message matches the signal segment of the first signal assigned to the preceding message. The information relating to the result of the comparison may thus be transmitted as a single bit for each of the plurality of signals. The data volume required for the transmission is accordingly very small.

In some example embodiments, the serial communications system is a CAN bus system. CAN bus systems, e.g., in transportation vehicles, require effective monitoring due to their increasing accessibility via the World Wide Web.

According to some example embodiments, the reference sequence is chosen depending on a transmission type of the CAN bus system. CAN bus systems support a multiplicity of transmission types (signal transmission types). The transmission types "Cyclic", "OnChange", "OnChangeWithRepetition", "IfActive", "IfActiveWithRepetition", "OnChangeAndIfActiveWithRepetition", "OnWrite", "OnWriteAndIfActiveWithRepetition" or "NoSigSendType" are mentioned here purely by way of example. Each of the transmission types of the CAN bus system has one or more characteristic reference sequences of the message states. The attack detection can be adapted accordingly to the transmission type of the CAN bus system that is used.

In some example embodiments, the comparison value for the comparison with the time difference between the start of the message and the start of the preceding message is a first used cycle time (e.g., normal cycle time), a second used cycle time (, fast cycle time), or an inhibit time of the CAN bus system. The CAN bus system can use a plurality of cycle times, each of which is characteristic of one transmission type. Attacks can accordingly be inferred from the comparison of the time interval of successive messages with one of the cycle times. The inhibit time accordingly represents a minimum time interval between two consecutive messages, the understepping of which represents an indication of an attack.

A further disclosed embodiment relates to a program with a program code for carrying out the method described herein when the program code is executed on a computer, a processor or a programmable hardware component.

A further disclosed embodiment relates to a device for detecting an attack on a serial communications system. In this case, the device comprises a processor circuit which is configured to determine a respective state of a plurality of messages transmitted via the serial communications system to obtain a sequence of states. The state of one of the plurality of messages is based in each case on a plurality of properties of the message and a plurality of properties of a preceding message of the plurality of messages. The processor circuit is further configured to compare the sequence of states with at least one reference sequence and to determine that an attack is being carried out on the serial communications system if the sequence of states deviates from the reference sequence. The state classification of a message and also the comparison of the sequence of states with the at least one reference sequence can be carried out very efficiently and with little processing power, so that the disclosed device can also enable a simple and efficient monitoring of a serial communications system.

In some example embodiments, the processor circuit may further be configured to carry out one or more of the method operations mentioned in connection with the disclosed method.

At least one disclosed embodiment relates to a transportation vehicle having a disclosed device for detecting an attack on a serial communications system, wherein the serial communications system is a CAN bus system of the transportation vehicle. Attacks on the CAN bus system of the transportation vehicle can accordingly be detected efficiently and with little processing power. Transportation vehicle safety can thus be increased.

FIG. 1 shows a method 100 for detecting an attack on a serial communications system. The method 100 comprises determining 102 a respective state of a plurality of messages transmitted via the serial communications system to obtain a sequence of states. The state of one of the plurality of messages is based in each case on a plurality of properties of the message and a plurality of properties of a preceding message of the plurality of messages. The method 100 further comprises comparing 104 the sequence of states with at least one reference sequence and determining 106a that an attack is being carried out on the serial communications system if the sequence of states deviates from the reference sequence.

If the sequence of states matches the reference sequence, the method 100 also comprises determining 106b that no attack has been carried out on the serial communications system.

The state classification of a message and also the comparison of the sequence of states with the at least one reference sequence in the method 100 can be carried out very efficiently and with little processing power, so the method 100 allows a simple and efficient monitoring of a serial communications system.

Further details and features of the method 100 are described in connection with one or more further example embodiments. The method 100 may comprise one or more optional features according to one or more of the further example embodiments.

Some example embodiments of the method are explained below with reference to the FIGS. 2 to 7. The serial communications system is designed in each case as a CAN bus system. However, the features of the method discussed in connection with the CAN bus system can obviously also be used in connection with other serial communications systems.

Figure 2:
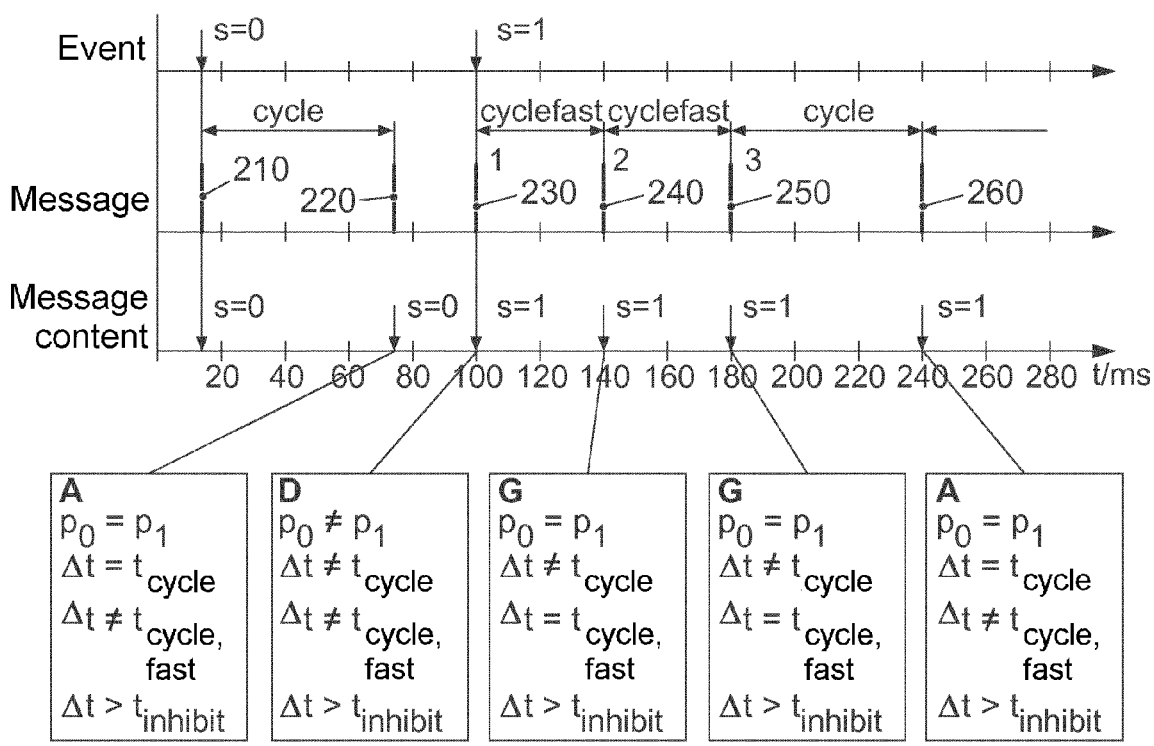
FIG. 2 shows an example embodiment of a data stream on a CAN bus system.

FIG. 2 shows a data stream on a CAN bus system. An event s=0 takes place at time T=15 ms so that a message 210 having the content s=0 is transmitted at T=15 ms via the CAN bus system. A second message 220 having the same content s=0 is transmitted at time T=75 ms, i.e., after a normal cycle time of 60 ms, via the CAN bus system.

The normal cycle is interrupted at T=100 ms and an OnChange message 230 having the content s=1 is initiated, since an event s=1 takes place at time T=100 ms. The message is repeated at times T=140 ms and T=180 ms, i.e., the messages 240 and 250 are transmitted with a fast cycle time T=40 ms of the CAN bus system.

The message 260 which has the content s=1 is transmitted at T=240 ms. The normal cycle time T=75 ms is therefore used again.

As already indicated above, the proposed monitoring of the CAN bus system is essentially based on the monitoring of the time behavior (combined with a comparison of message contents), since such anomalies, i.e., additionally inserted messages, in the data stream can thus be detected. In other words, monitoring is based on the principle of pattern recognition.

The characteristic properties or features, i.e., the states of a message, are derived from two consecutive messages. A first feature of a message, for example, can be obtained by comparing whether the message contents/signal contents (payload) are identical. Further properties can be derived from the time period between the two messages. For example, compliance with the normal and fast cycle time tcycle and tcycle,fast and compliance with the inhibit time tinhibit can be checked. In summary, the state of a message can be determined at least from the following comparisons:

1. Is $p_o = p_1$?
2. Is $\Delta t = t_0 - t_1 = t_{cycle}$?
3. Is $\Delta t = t_0 - t_1 = t_{cycle,fast}$?
4. Is $\Delta t = t_0 - t_1 < t_{inhibit}$?

where $p_i$ denotes the content of a message and $t_1$ the time of the start of a message with i={0,1}. The indices 0 and 1 identify the two consecutive messages. A tolerance range can also be taken into account in the comparison times tcycle, tcycle,fast and tinhibit. The comparison times tcycle, tcycle,fast and tinhibit can be stored in the monitoring system for each message content to be monitored.

The features found can be understood as low-level descriptors. The simple queries individually may be of no importance per se. However, their joint consideration, i.e., the overall consideration, provides the desired information relating to the state of a message. In this way, the detection of bus anomalies can be reduced to simple queries.

As already indicated above, the low-level descriptors can be understood as a set of suitable comparison operators from which a characteristic state can be derived. The comparisons are obviously not limited to the above comparison operators, but, e.g., can also be represented by ">", "≤", "≥", "≠" comparisons and/or combinations thereof.

The use of low-level descriptors which are not based on a comparison of the two messages is equally possible. The inactivity condition in certain signal transmission types of the CAN bus system can be mentioned here purely by way of example:

5. Is $p_1 = p_{inactive}$?

If only the four above-mentioned characteristic properties of the two messages are considered, a state is defined by them. The different possible states are shown in the following truth table:

TABLE 1

| State | $p_o = p_1$ | $\Delta t = t_{cycle}$ | $\Delta t = t_{cycle, fast}$ | $\Delta t < t_{inhibit}$ |
| --- | --- | --- | --- | --- |
| A | 1 | 1 | 0 | 0 |
| B | 0 | 1 | 0 | 0 |
| C | 1 | 0 | 0 | 0 |
| D | 0 | 0 | 0 | 0 |
| E | 1 | 1 | 1 | 0 |
| F | 0 | 1 | 1 | 0 |
| G | 1 | 0 | 1 | 0 |
| H | 0 | 0 | 1 | 0 |
| J | X | X | X | 1 |

"0" indicates in each case that the condition is not satisfied. "1" indicates in each case that the condition is satisfied. "X" indicates that the condition may be satisfied or not satisfied (i.e., the result of the comparison may be random).

The truth table 1 can be used both for CAN bus transmission types which transmit messages only with a constant cycle time, and for transmission types that transmit messages with normal and short cycle times. The first-mentioned transmission type (with a constant cycle time) represents a special case, because here only compliance with the normal cycle time has to be monitored to detect additionally inserted messages.

States B and J directly indicate an error in the time behavior. States D and H each contain redundant information and can be combined. States E and F are illogical and cannot occur.

The information of a reduced truth table can therefore be sufficient for a complete state description:

TABLE 2

| State | $p_o = p_1$ | $\Delta t = t_{cycle}$ | $\Delta t = t_{cycle, fast}$ | $\Delta t < t_{inhibit}$ | Comment |
| --- | --- | --- | --- | --- | --- |
| J | X | X | X | 1 | Error |
| B | 0 | 1 | 0 | 0 | Error |
| G | 1 | 0 | 1 | 0 | Repetitions |
| A | 1 | 1 | 0 | 0 | normal operation |
| C | 1 | 0 | 0 | 0 | OnChange or IfActive ended |
| D | 0 | 0 | 0 | 0 | OnChange or IfActive ended |

By Table 2, 4-bit information can be obtained which reflects the state of two consecutive messages and characterizes time behavior such as message content. If the checking of the inhibit time (tinhibit) is carried out independently (e.g., using a different method), even the 3-bit information formed from columns 2 to 4 may be sufficient to characterize a message. The benefit of this lies in the storage-space-saving 4-bit or 3-bit information and the application of simple comparison operators. Further comparison operators and accordingly information with more bits can obviously also be used.

Based on the comparisons described above for state determination, a state can now be assigned to all messages in FIG. 2. Message 220 has a normal cycle time and therefore corresponds to state A (see Table 1 or 2). Message 230 corresponds accordingly to state D, since it is an OnChange message. Messages 240 and 250 highlight repetitions with a fast cycle time and therefore have state G. State A is assigned in turn to message 260. A change of state is thus shown in FIG. 2. In the data stream shown in FIG. 2, the sequence of states is thus . . . A A D G G A A . . . . Time behavior and message behavior are thus represented by a temporal sequence of states, i.e., a typical pattern.

Every signal transmission type has its own, typical pattern over time in undisturbed operation. Each transmission type thus has a reference sequence of states. The reference sequences of states may, for example, appear as follows:

TABLE 3

| Transmission type | Reference sequence |
| --- | --- |
| 1 cyclic | uA vB |
| 2 OnChange, restart of the cycle | A xD A |
| 3 OnChange, maintenance of the cycle | A xD C A |
| 4 OnChangeWithRepetition, restart of the cycle | A xD nG A |
| 5 OnChangeWithRepetition, maintenance of the cycle | A xD nG A |
| 6 IfActive | A u {xD yG} A |
| 7 IfActiveWithRepetition | A u {xD yG} D nG A |
| 8 OnChangeAndIfActive | A u {xD yG} D A |
| 9 OnChangeAndIfActiveWithRepetition | A u {xD yG} v {D nG} A |

In Table 3, A, C, D and G in each case again denote a state of a message. The letters u, v, x in each case denote a variable and n denotes a constant indicating the number of permitted repetitions. The brackets { . . . } in each case denote a pattern block, which is repeated according to the preceding variable u, v.

Since a plurality of OnChange states can occur in succession, this is taken into account for the respective transmission types with xD. If, as with transmission type 3, the old timing can be resumed after an OnChange, state C occurs. Repetitions with a fast cycle time are detected with state G.

If the data stream shown in FIG. 2 is now a data stream of the CAN bus system for signal transmission type 4, the sequence of states matches the reference sequence according to Table 3 (here x=1 and n=2). If the data stream were a data stream of the CAN bus system for signal transmission type 3, the sequence of states would not match the reference sequence according to Table 3. This would therefore provide an indication of an attack, since deviations from the typical pattern or exceeding of the permissible repetitions (i.e., deviations from the reference sequence) directly point to an error in the time behavior, i.e., a manipulation.

An attack can consist, e.g., in the insertion at short intervals of messages with the corresponding CAN identification (CAN ID) and the desired content. Similarly, for example, following a message with the corresponding CAN ID, a further message with this ID and an adapted content can be inserted. Also, following each message with the corresponding CAN ID, a further message with this ID and the adapted content can be inserted, wherein the inhibit time is observed. In addition, before the next clock pulse, the current, original message can always be inserted, taking into account the inhibit time. Alternatively, a plurality of messages can be inserted with a fast cycle time. No intervention takes place with an original OnChange.

In connection with FIGS. 3 and 4, it will be explained below how an attack can be inferred from the counting of states indicated above.

Figure 3:
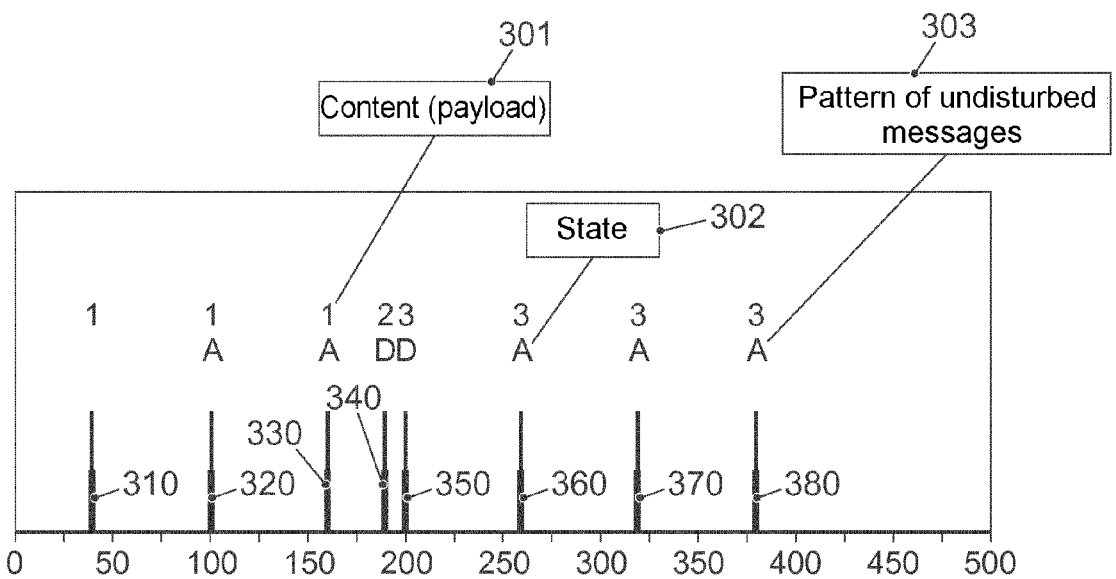
FIG. 3 shows an example embodiment of an undisturbed sequence of messages.

FIG. 3 shows an undisturbed sequence of messages 310, 320, ..., 380. Each message has a respective content 301. A state 302 is further assigned to each message in accordance with the principles described above. This results in the following sequence (or pattern) 303 of states: A A D D A A A.

As already indicated above, a simple form of pattern recognition can be implemented by state counters. For this purpose, a counter is incremented if a first state occurs within the sequence of states. If a second state occurs within the sequence of states, the counter is reset to its initial value. A state counter can be used, for example, in each case for the states B, C, D and G. If one of the states B, C, D or G occurs, the respective state counter is incremented. In this example, state A causes the counters to be reset. The exceeding of the respective permissible limit values (threshold values) is a direct indication of a manipulation.

Figure 4:
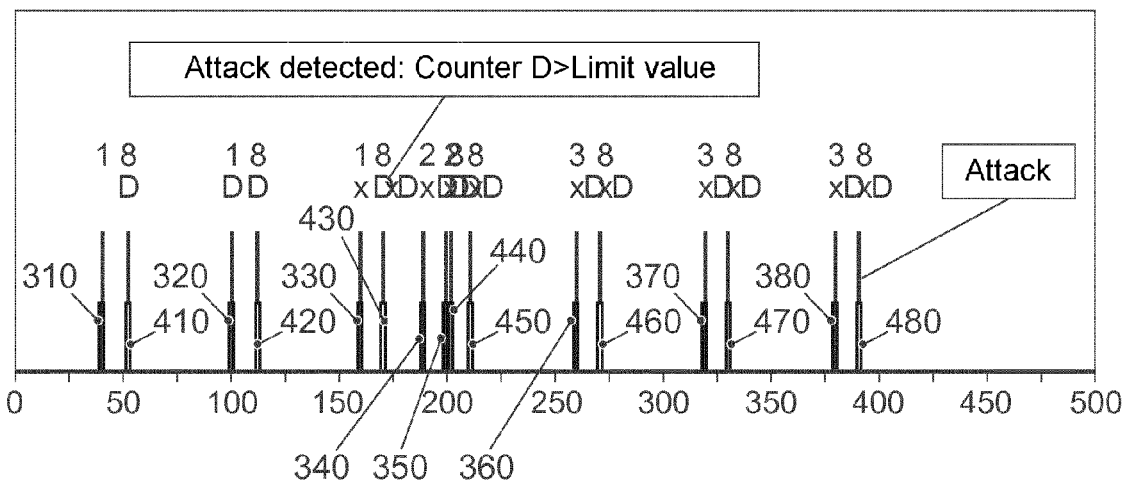
FIG. 4 shows an example embodiment of a disturbed sequence of messages.

Whereas the characteristic pattern of an undisturbed signal is shown in FIG. 3, FIG. 4 shows a disturbed sequence of messages. In addition to the original messages 310, 320, ..., 380 also shown in FIG. 3, the inserted messages 410, 420, ..., 480 are shown in FIG. 4. The message contents are again shown as numbers and the states as letters.

Additional messages change the characteristic pattern, i.e., they deviate from the reference sequence of messages. In the example shown in FIG. 4, compared with FIG. 3, state A no longer occurs due to the additional messages 410, 420, ..., 480. The state counter for state D continues to be incremented accordingly and is no longer reset. After exceeding the threshold value for the state counter of state D at time T=170 ms, it is established that a deviation from the reference sequence and therefore an attack on the CAN bus system have occurred.

In addition to the counting method, the pattern can also be checked during a change of state to ensure the correctness of the pattern (the sequence of states) or the correct order of the individual states. An additionally inserted message also results in a change in the pattern profile (the sequence of states), which can be interpreted as a change of state and can be checked. A catalog of permitted state patterns (second reference sequences) against which the changes of state are compared can be created from the possible options.

Figure 5:
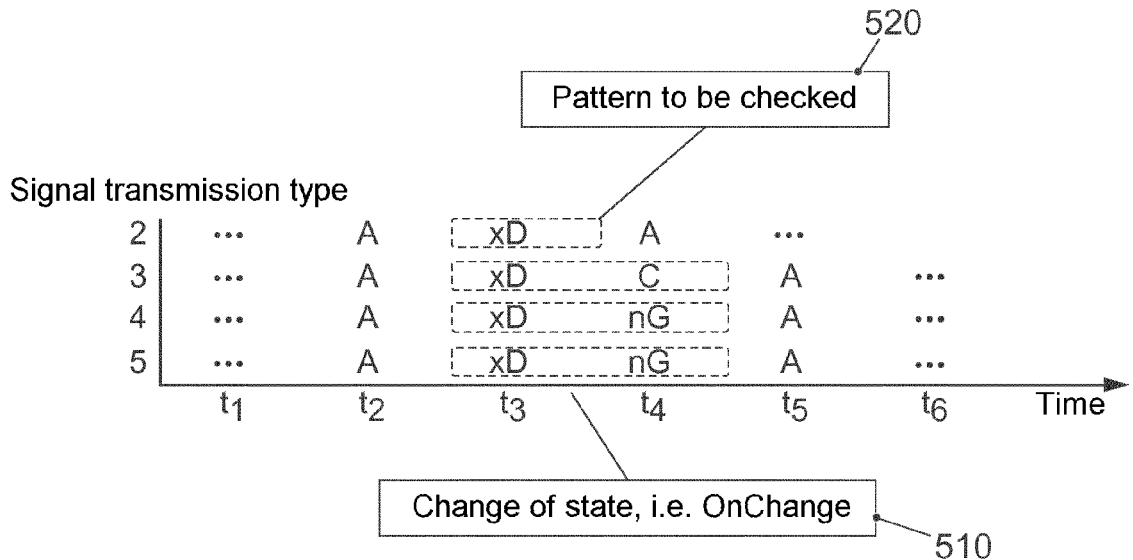
FIG. 5 shows an example embodiment of a sequence of messages for different transmission types of a CAN bus system.

FIG. 5 shows different transmission types 2 to 5 of a CAN bus system over time. Transmission type 2 represents "OnChange" (restart of the cycle), transmission type 3 represents "OnChange" (maintenance of the cycle), transmission type 4 represents "OnChangeWithRepetition" (restart of the cycle) and transmission type 5 represents "OnChangeWithRepetition" (maintenance of the cycle). A change of state from A to D occurs at time t3. The change of state 510 ends for transmission type 2 at time t4 and for the other transmission types shown at time t5, since state A occurs from then on. The pattern now to be checked covers the period from the beginning to the conclusion of a detected change of state, i.e., states other than A.

This means that, for each signal transmission type, a subarea 520 of the illustrated sequence of states is compared with a second reference sequence. The subarea 520 of the sequence of states comprises only states which are different from a second state (here A). If the subarea 520 of the sequence of states deviates from the second reference sequence, it is determined that an attack is being carried out on the CAN bus system.

Figure 6:
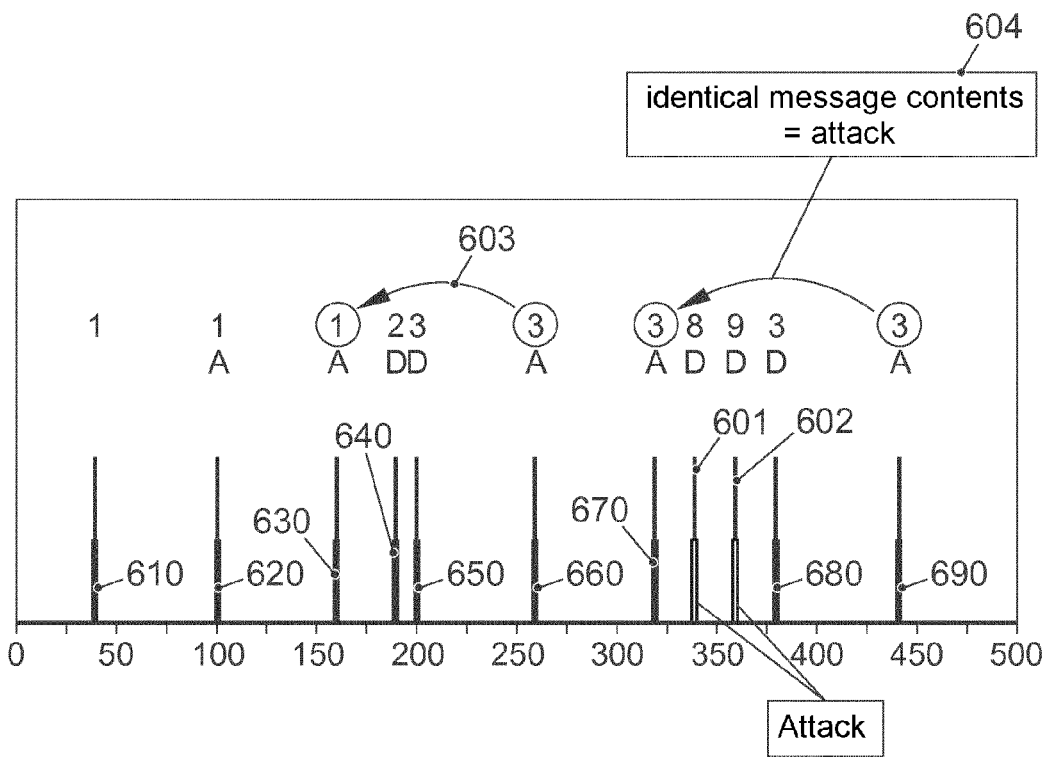
FIG. 6 shows a further example embodiment of a disturbed sequence of messages.

FIG. 6 also shows a monitoring by extended pattern recognition. The attacks described above can, for example, be reliably detected with the method described above. Individual, targeted attacks, however, may possibly not be detected.

Along with the original messages 610, 620, ..., 690, the messages 601 and 602 which are intended to simulate a change of state are also inserted into the data stream shown in FIG. 6 from time T=340 ms.

With the counting method and the pattern recognition based on the comparison of two immediately consecutive messages, this anomaly may possibly not be detected, since the respective state counters do not exceed their threshold value. However, a comparison of the message contents before and after a normal or manipulated change of state can remedy this.

As indicated by the arrows 603 and 604, the content of a first message of the plurality of messages can be compared with the content of a second message of the plurality of messages. The state of the first message 630 and 670 is identical to the state of the second message 660 and 690 (i.e., A). Messages 640 and 650 or 601 and 602 with a state differing from the state of the first message 630 and 670 (here D) are transmitted in each case via the CAN bus system between the first message 630 and 670 and the second message 660 and 690.

The message content changes during a normal change of state. Whereas the message 630 has the content 1, the second message 660 has the content 3. The messages 630 and 660 are separated only by the normal messages 640 and 650 in each case with state D.

The message content does not change during an abnormal change of state. Both the first message 670 and the second message 690 have the content 3. The messages 670 and 690 are separated by the abnormal messages 601 and 602 in each case with state D. The comparison of the message contents thus enables the detection of the abnormal (inserted) messages 601 and 602.

It can thus be reliably determined whether an attack is being carried out on the CAN bus system.

To compare the message contents, the message content can, for example, be stored prior to a change of state.

Figure 7:
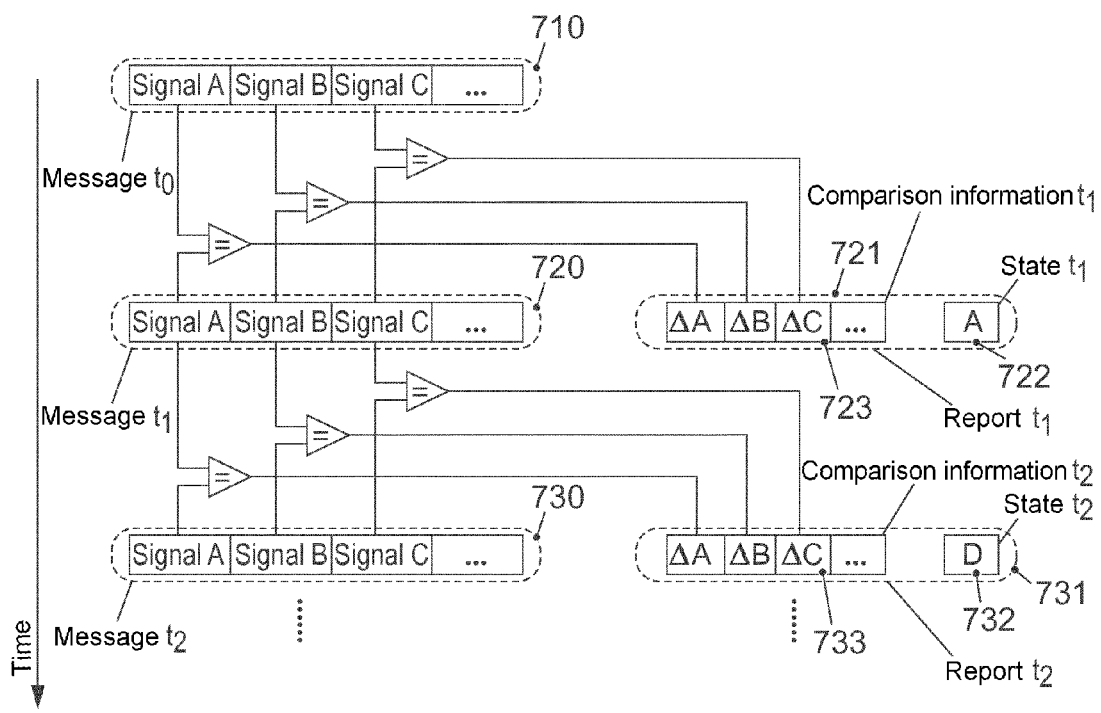
FIG. 7 shows an example embodiment of a comparison of signals of a CAN bus system.

FIG. 7 shows how detected attacks can be effectively stored and transmitted to a person responsible for the CAN bus system.

To enable comprehensive analysis of an attack, it may be helpful to store as much detailed information as possible and/or to transmit it to a person responsible (e.g., a central office or control room). A message can be transmitted, for example, to a receiving device of a monitoring station for the CAN bus system if it is determined that an attack is being carried out on the CAN bus system. The message then comprises, e.g., information relating to the attack on the serial communications system. However, not only the attack, but also a certain period before and/or after the attack can be reported. In other words, the information relating to the attack on the CAN bus system can comprise information relating to at least a subarea of the examined sequence of states. However, the data volume required for this purpose can become so great that transmission is not possible and/or the storage space of the detection system is insufficient.

As already described above, a simple and storage-space-saving facility for profile data storage can be derived from the state patterns (sequences of states). The time behavior or message content can be approximated with the 4-bit information described above (or information having a different bit length, see above). Effective storage or transmission can be enabled by transmitting the 4-bit information to a receiving device of a monitoring station for the CAN bus system.

A message can be composed of a plurality of signals. FIG. 7 shows, for example, that the message 710 is composed of the plurality of signals A, B, C, . . . at time t0. The further messages 720 and 730 at times t1 and t2 are also transmitted by this plurality of signals A, B, C, . . . via the CAN bus system. In other words, a plurality of messages are transmitted in each case via a plurality of signals via the CAN bus system.

To analyze an attack, it may be helpful to know which signals have been attacked. This information can be obtained, for example, by comparing the signals for two consecutive messages. The disclosed method can therefore comprise comparing a signal segment of a first of the plurality of signals assigned to a message with a signal segment of the first signal assigned to a preceding message. This comparison may be carried out for some or all of the plurality of signals that are used. The information relating to the attack on the CAN bus system transmitted to the monitoring station for the CAN bus system can accordingly comprise information relating to a result of the comparison of the signal segment of the first signal assigned to the message with the signal segment of the first signal assigned to the preceding message. The transmitted information relating to the attack on the CAN bus system can accordingly also comprise information relating to results of the comparisons of the further signals.

This is shown by way of example in FIG. 7 for the messages 720 and 730. For the message 720, the information 721 relating to the attack on the CAN bus system transmitted to the monitoring station for the CAN bus system comprises the state 722 of the message 720 as 4-bit information and the information 723 relating to the results of the comparisons of the signal segments of the plurality of signals A, B, C, . . . assigned to the message 720 with the signal segments of the plurality of signals A, B, C, . . . assigned to the preceding message 710. The information 731 relating to the attack on the CAN bus system transmitted to the monitoring station for the CAN bus system for the message 730 accordingly comprises the state 732 of the message 730 as 4-bit information and the information 733 relating to the results of the comparisons of the signal segments of the plurality of signals A, B, C, . . . assigned to the message 730 with the signal segments of the plurality of signals A, B, C, . . . assigned to the preceding message.

The matching of two signals (or signal segments) can be encoded, e.g., with a "1" whereas the mismatch is encoded with a "0" (or vice versa). In other words, the information relating to the result of the comparison transmitted to the monitoring station for the CAN bus system can be binary information which indicates whether the signal segment of a signal assigned to the message matches the signal segment of the signal assigned to the preceding message. A data reduction can thus be achieved. The number of bits required for the transmission is derived from the number of signals used to transmit the message.

The state patterns (sequence of states) and also the comparison information can provide indications of the progress of an attack on a particular message content or message signal and, in accordance with the principles described in connection with FIG. 7, can be effectively reported to, e.g., a control center or can be stored in the detection system (i.e., in a device which carries out the disclosed method).

Figure 8:
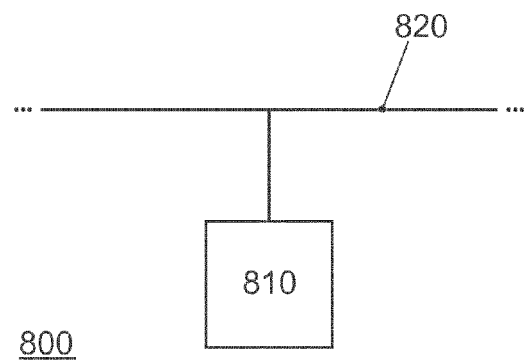
FIG. 8 shows an example embodiment of a device for detecting an attack on a serial communications system.

FIG. 8 further shows a device 800 for detecting an attack on a serial communications system 810. The device 800 comprises a processor circuit 810 configured to define a respective state of a plurality of messages transmitted via the serial communications system 820 to obtain a sequence of states. The state of one of the plurality of messages is based in each case on a plurality of properties of the message and a plurality of properties of a preceding message of the plurality of messages. The processor circuit 810 is further configured to compare the sequence of states with at least one reference sequence and to determine that an attack is being carried out on the serial communications system 820 if the sequence of states deviates from the reference sequence. The state classification of a message and also the comparison of the sequence of states with the at least one reference sequence by the processor circuit 810 can be performed very efficiently and with little processing power so that the device 800 can enable a simple and efficient monitoring of the serial communications system 820.

Further details and features of the device 800 are described in connection with one or more further example embodiments. The device 800 may comprise one or more optional features according to one or more of the further example embodiments.

Figure 9:
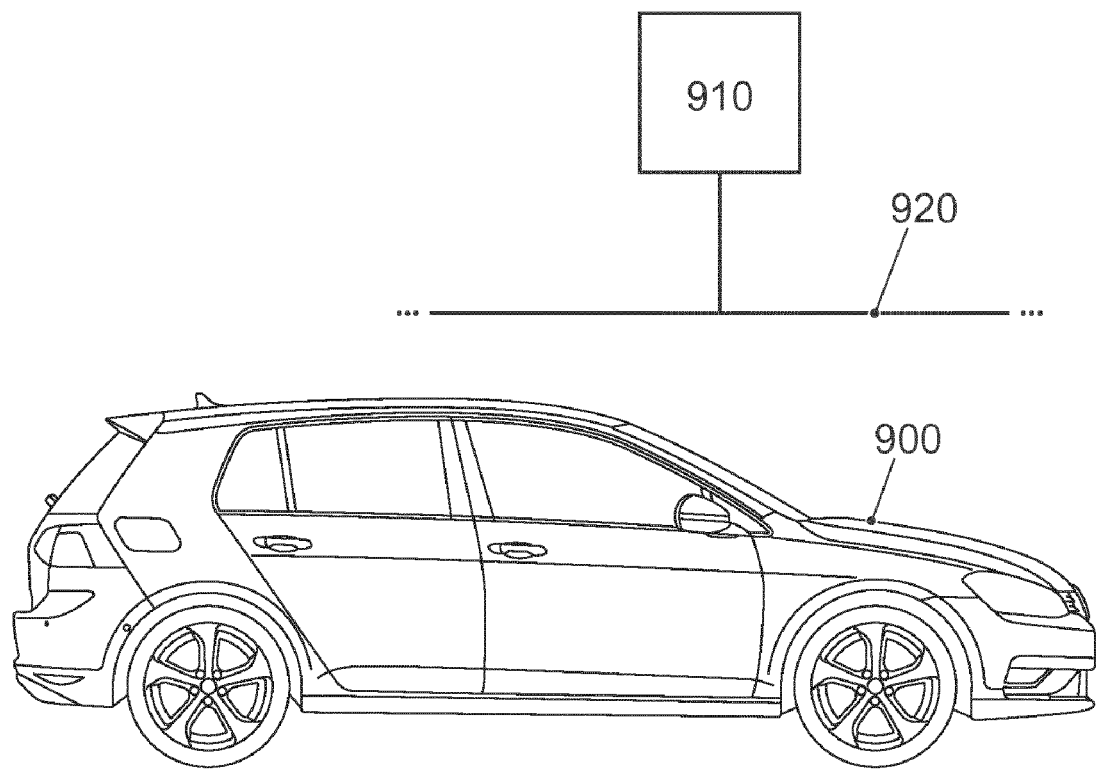
FIG. 9 shows an example embodiment of a transportation vehicle.

Finally, FIG. 9 also shows a transportation vehicle 900 along with a CAN bus system 920 of the transportation vehicle 900. The transportation vehicle further comprises a device 910 for detecting an attack on a serial communications system. Attacks on the CAN bus system 920 of the transportation vehicle 900 can be detected efficiently and with little processing power via the device 910.

REFERENCE NUMBER LIST

100 Method for detecting an attack on a serial communications system
102 Determine a respective state
104 Compare the sequence of states
106a Determine that an attack is being carried out
106b Determine that no attack is being carried out
210 Message
220 Message
230 Message
240 Message
250 Message
260 Message
301 Content of a message
302 State
303 Sequence of states
310 Original message
320 Original message
330 Original message
340 Original message
350 Original message
360 Original message
370 Original message
380 Original message
410 Inserted message
420 Inserted message
430 Inserted message
440 Inserted message
450 Inserted message 460 Inserted message
470 Inserted message
480 Inserted message
510 Change of state
520 Subarea of a sequence of states
601 Inserted message
602 Inserted message
603 Arrow
604 Arrow
610 Original message
620 Original message
630 Original message
640 Original message
650 Original message
660 Original message
670 Original message
680 Original message
690 Original message
710 Message
720 Message
721 Information relating to the attack on the CAN bus system
722 State of the message
723 Information relating to the results of the comparisons
730 Message
731 Information relating to the attack on the CAN bus system
732 State of the message
733 Information relating to the results of the comparisons
800 Device for detecting an attack on a serial communications system
810 Processor circuit
820 Serial communications system
900 Transportation vehicle
910 Device for detecting an attack on a serial communications system
920 CAN bus system

The invention claimed is:

1. A method for detecting an attack on a serial communications system, the method comprising:
    determining a respective state of a plurality of messages transmitted via the serial communications system to obtain a sequence of states, wherein the state of each of the plurality of messages is based on a plurality of properties of each message and a plurality of properties of a preceding message of the plurality of messages;
    comparing the sequence of states with at least one reference sequence;
    determining that an attack is being carried out on the serial communications system in response to the sequence of states deviating from the reference sequence; and
    comparing content of a first message of the plurality of messages with content of a second message of the plurality of messages, wherein the state of the first message is identical to the state of the second message, and wherein at least a third message having a state different from the state of the first message is transmitted between the first and the second message via the serial communications system,
    wherein the determination that an attack is being carried out on the serial communications system is made in response to the content of the second message being identical to the content of the first message.

2. The method of claim 1, wherein the state of the message is based at least on a first comparison of a content of the message with a content of the preceding message and on a second comparison of the time difference between a start of the message and a start of the preceding message with a comparison value.

3. The method of claim 1, wherein comparing the sequence of states with at least one reference sequence comprises:
    incrementing a counter in response to a first state occurring within the sequence of states;
    resetting the counter to an initial value in response to a second state occurring within the sequence of states; and
    determining that the sequence of states deviates from the reference sequence in response to the counter exceeding a threshold value.

4. The method of claim 3, further comprising:
    comparing a subarea of the sequence of states with at least one second reference sequence, wherein the subarea of the sequence of states includes only states which differ from the second state; and
    determining that an attack is being carried out on the serial communications system in response to the subarea of the sequence of states deviating from the second reference sequence.

5. The method of claim 1, further comprising:
    transmitting a message to a receiving device of a monitoring station for the serial communications system in response to a determination that an attack is being carried out on the serial communications system, wherein the message comprises information relating to the attack on the serial communications system.

6. The method of claim 5, wherein the information relating to the attack on the serial communications system comprises information relating to at least a subarea of the sequence of states.

7. The method of claim 5, wherein the plurality of messages are transmitted in each case via a plurality of signals via the serial communications system, wherein the method further comprises comparing a signal segment of a first of the plurality of signals assigned to the message with a signal segment of the first signal assigned to the preceding message, and wherein the information relating to the attack on the serial communications system comprises information relating to a result of the comparison of the signal segment of the first signal assigned to the message with the signal segment of the first signal assigned to the preceding message.

8. The method of claim 7, wherein the information relating to the result of the comparison is binary information which indicates whether the signal segment of the first signal assigned to the message matches the signal segment of the first signal assigned to the preceding message.

9. The method of claim 1, wherein the serial communications system is a Controller Area Network bus system.

10. The method of claim 9, wherein the reference sequence is chosen based on a transmission class of the Controller Area Network bus system.

11. The method of claim 9, wherein the comparison value is a first used cycle time, a second used cycle time or an inhibit time of the Controller Area Network Bus system.

12. A tangible, non-transitory computer readable medium including a computer program with program code for carrying out a method for detecting an attack on a serial communications system when the program code is executed on a computer, a processor or a programmable hardware component, the method comprising:
    determining a respective state of a plurality of messages transmitted via the serial communications system to obtain a sequence of states, wherein the state of each of the plurality of messages is based in each case on a plurality of properties of the message and a plurality of properties of a preceding message of the plurality of messages;

comparing the sequence of states with at least one reference sequence;

determining that an attack is being carried out on the serial communications system in response to the sequence of states deviates deviating from the reference sequence;

and comparing content of a first message of the plurality of messages with content of a second message of the plurality of messages, wherein the state of the first message is identical to the state of the second message, and wherein at least a third message having a state different from the state of the first message is transmitted between the first and the second message via the serial communications system, wherein the determination that an attack is being carried out on the serial communications system is made in response to the content of the second message being identical to the content of the first message.

13. A device for detecting an attack on a serial communications system, the device comprising a processor circuit configured to:

determine a respective state of a plurality of messages transmitted via the serial communications system to obtain a sequence of states, wherein the state of one of the plurality of messages is based in each case on a plurality of properties of each message and a plurality of properties of a preceding message of the plurality of messages;

compare the sequence of states with at least one reference sequence; and determine that an attack is being carried out on the serial communications system in response to the sequence of states deviating from the reference sequence; and compare content of a first message of the plurality of messages with content of a second message of the plurality of messages, wherein the state of the first message is identical to the state of the second message, and wherein at least a third message having a state different from the state of the first message is transmitted between the first and the second message via the serial communications system, wherein the determination that an attack is being carried out on the serial communications system is made in response to the content of the second message being identical to the content of the first message.

14. A transportation vehicle comprising the device of claim 13 for detecting an attack on the serial communications system, wherein the serial communications system is a Controller Area Network bus system of the transportation vehicle.

15. The device of claim 13, wherein the state of the message is based at least on a first comparison of a content of the message with a content of the preceding message and on a second comparison of the time difference between a start of the message and a start of the preceding message with a comparison value.

16. The device of claim 13, wherein comparing the sequence of states with at least one reference sequence comprises:

incrementing a counter in response to a first state occurring within the sequence of states;

resetting the counter to an initial value in response to a second state occurring within the sequence of states; and determining that the sequence of states deviates from the reference sequence in response to the counter exceeding a threshold value.

17. The device of claim 16, wherein a subarea of the sequence of states is compared with at least one second reference sequence, wherein the subarea of the sequence of states includes only states which differ from the second state, and wherein a determination that an attack is being carried out on the serial communications system is made in response to the subarea of the sequence of states deviating from the second reference sequence.

18. The device of claim 13, wherein a message is transmitted to a receiving device of a monitoring station for the serial communications system in response to a determination that an attack is being carried out on the serial communications system, wherein the message comprises information relating to the attack on the serial communications system.

19. The device of claim 18, wherein the information relating to the attack on the serial communications system comprises information relating to at least a subarea of the sequence of states.

20. The device of claim 18, wherein the plurality of messages are transmitted in each case via a plurality of signals via the serial communications system, wherein the method further comprises comparing a signal segment of a first of the plurality of signals assigned to the message with a signal segment of the first signal assigned to the preceding message, and wherein the information relating to the attack on the serial communications system comprises information relating to a result of the comparison of the signal segment of the first signal assigned to the message with the signal segment of the first signal assigned to the preceding message.

21. The device of claim 20, wherein the information relating to the result of the comparison is binary information which indicates whether the signal segment of the first signal assigned to the message matches the signal segment of the first signal assigned to the preceding message.

22. The device of claim 13, wherein the serial communications system is a Controller Area Network bus system.

23. The device of claim 22, wherein the reference sequence is chosen based on a transmission class of the Controller Area Network bus system.

24. The device of claim 22, wherein the comparison value is a first used cycle time, a second used cycle time or an inhibit time of the Controller Area Network Bus system.

* * * * *